US012173679B1

(12) United States Patent
Lee

(10) Patent No.: US 12,173,679 B1
(45) Date of Patent: Dec. 24, 2024

(54) COOLING TOWER WITH HYDROELECTRIC POWER GENERATION UNIT

(71) Applicant: Chi-Hsuan Hsu, Hsinchu (TW)

(72) Inventor: Shu-Yi Lee, Hsinchu (TW)

(73) Assignee: Chi-Hsuan Hsu, Hsinchu (TW)

( * ) Notice: Subject to any disclaimer, the term of this patent is extended or adjusted under 35 U.S.C. 154(b) by 0 days.

(21) Appl. No.: 18/350,523

(22) Filed: Jul. 11, 2023

(51) Int. Cl.
*F03B 13/00* (2006.01)
*F28C 1/00* (2006.01)

(52) U.S. Cl.
CPC ........ *F03B 13/00* (2013.01); *F05B 2240/912* (2013.01); *F28C 1/00* (2013.01)

(58) Field of Classification Search
CPC ...... F03B 13/00; F28C 1/00; F05B 2220/706; F05B 2240/912
See application file for complete search history.

(56) References Cited

U.S. PATENT DOCUMENTS 3,454,027 A * 7/1969 Friedman, Jr. .......... C02F 1/686 137/101.21
4,110,980 A * 9/1978 Foulke .................... F03B 13/00 417/404

FOREIGN PATENT DOCUMENTS

KR 20150141302 A * 12/2015
TW 096212528 4/2008

* cited by examiner

*Primary Examiner* — Julio C. Gonzalez
(74) *Attorney, Agent, or Firm* — Wang Law Firm, Inc.

(57) ABSTRACT

A cooling tower with a hydroelectric power generation unit includes a tower body, a water spraying device, and a water guiding plate, in addition to the hydroelectric power generation unit. The tower body has a water collection tank divided into a water-collecting tank area and a power-generating tank area. The water sprayed out by the water spraying device is guided by the water guiding plate into the water-collecting tank area. When the water-collecting tank area is full, the water in the water-collecting tank area flows into the power-generating tank area through the partition portion, or more particularly through the hydroelectric power generation unit, such that the hydroelectric power generation unit generates electricity from a difference in water level. By directly converting the potential energy of cooled cooling water into electric energy that can be stored or used, the cooling tower saves energy and contributes to environmental protection.

10 Claims, 3 Drawing Sheets

COOLING TOWER WITH HYDROELECTRIC POWER GENERATION UNIT

BACKGROUND

Field of the Invention

The present invention relates to a cooling tower and more particularly to a cooling tower with a hydroelectric power generation unit.

Description of Related Art

A cooling tower is a device for cooling water, or more particularly a device in which water is cooled by exchanging heat with the air flowing through the device. Cooling towers are widely used in water circulation systems in air conditioning and industrial applications.

A typical cooling tower has the following structures: A pipe is provided in a top portion of the tower body to spray in a downward direction the water to be cooled. A blower is mounted on the tower wall to blow air into the tower, and the air is drawn out of the tower through, and by a large fan provided at, the tower top to generate an airflow and thereby accelerate the decrease in temperature of the water to be cooled. PVC-made heat dissipation plates having a wavy and reticulated configuration are provided above and below the water spraying pipe to increase the time required to dissipate heat from the sprayed water drops, and the double-curve shape of the tower body is intended to facilitate the exchange of heat between water and air through convection.

Currently, the functional designs of cooling towers are mostly directed to solving such technical problems as filtering out the impurities in water and removing the deposited scale in a manual or automated manner (one example of such prior art being Taiwan Patent Application No. 096212528, entitled "WATER COOLING TOWER WITH FUNCTION OF SEPARATING SILT IN WATER") and seldom involve designs for reducing carbon dioxide emissions or reducing the use of resources. In contrast, the technical problem to be solved by the present invention is to develop a cooling tower that has a hydroelectric power generation unit.

SUMMARY

One objective of the present invention is to provide a cooling tower that has a hydroelectric power generation unit.

To achieve the foregoing objective, the present invention provides a cooling tower that includes a tower body, a water spraying device, a water guiding plate, and a hydroelectric power generation unit. The tower body has a water collection tank. The water collection tank is provided with a partition portion and is divided by the partition portion into a water-collecting tank area and a power-generating tank area adjacent to the water-collecting tank area. The water spraying device is provided in the tower body and is located above the water-collecting tank area. The water guiding plate is provided in the tower body, is located between the water collection tank and the water spraying device, and has a water guiding portion corresponding to the water spraying device and a water outlet connected to the water guiding portion and located above the water-collecting tank area. The hydroelectric power generation unit is provided in the power-generating tank area of the tower body and is adjacent to the partition portion. When the water in the water-collecting tank area flows through the partition portion into the power-generating tank area, the same water flows through the hydroelectric power generation unit such that the hydroelectric power generation unit generates electricity from a water level difference of the water.

The present invention has the following effects: With the water collection tank of the tower body divided into the water-collecting tank area and the power-generating tank area, and with the water spraying device, the water guiding plate, and the hydroelectric power generation unit designed to work with the divided water collection tank, the water sprayed out by the water spraying device will be guided by the water guiding plate into the water-collecting tank area, and once the water-collecting tank area is full, the water in the water-collecting tank area will flow into the power-generating tank area through the partition portion. More specifically, the water flowing into the power-generating tank area will flow through the hydroelectric power generation unit such that the hydroelectric power generation unit generates electricity from a water level difference of the water. According to the invention, the potential energy of cooling water that has been cooled down by the cooling tower can be converted directly into electric energy, and the electric energy generated can be either stored or used by a load. Thus, the invention produces an energy-saving effect and contributes to environmental protection.

Preferably, the hydroelectric power generation unit includes a housing, an electric generator, and a helical vane. The housing is provided in the power-generating tank area, is supported by the partition portion, and has a water inlet portion and a water outlet portion lower than the water inlet portion. The electric generator has a power generation module and a power-generating rotating shaft extending in the housing. The helical vane is provided in the housing, is fixedly provided on the power-generating rotating shaft, and is configured to rotate in place. When the water in the water-collecting tank area flows through the partition portion into the power-generating tank area, the same water flows into the housing through the water inlet portion, exits the housing through the water outlet portion, and thereby drives the helical vane into rotation.

Preferably, the hydroelectric power generation unit includes a housing, an electric generator, and runner vanes. The housing is provided in the power-generating tank area, is adjacent to the partition portion, and has a water inlet portion supported by the partition portion and a water outlet portion lower than the water inlet portion. The electric generator has a power generation module and a power-generating rotating shaft extending in the housing. The runner vanes are provided in the housing, are fixedly provided on the power-generating rotating shaft, and are configured to rotate in place. When the water in the water-collecting tank area flows through the partition portion into the power-generating tank area, the same water flows into the housing through the water inlet portion, exits the housing through the water outlet portion, and thereby drives the runner vanes into rotation.

Preferably, the cooling tower further includes an electric pump, and the electric pump is provided in the power-generating tank area of the tower body or is provided outside the tower body.

Preferably, the electric pump is electrically connected to the electric generator.

DETAILED DESCRIPTION

Figure 1:
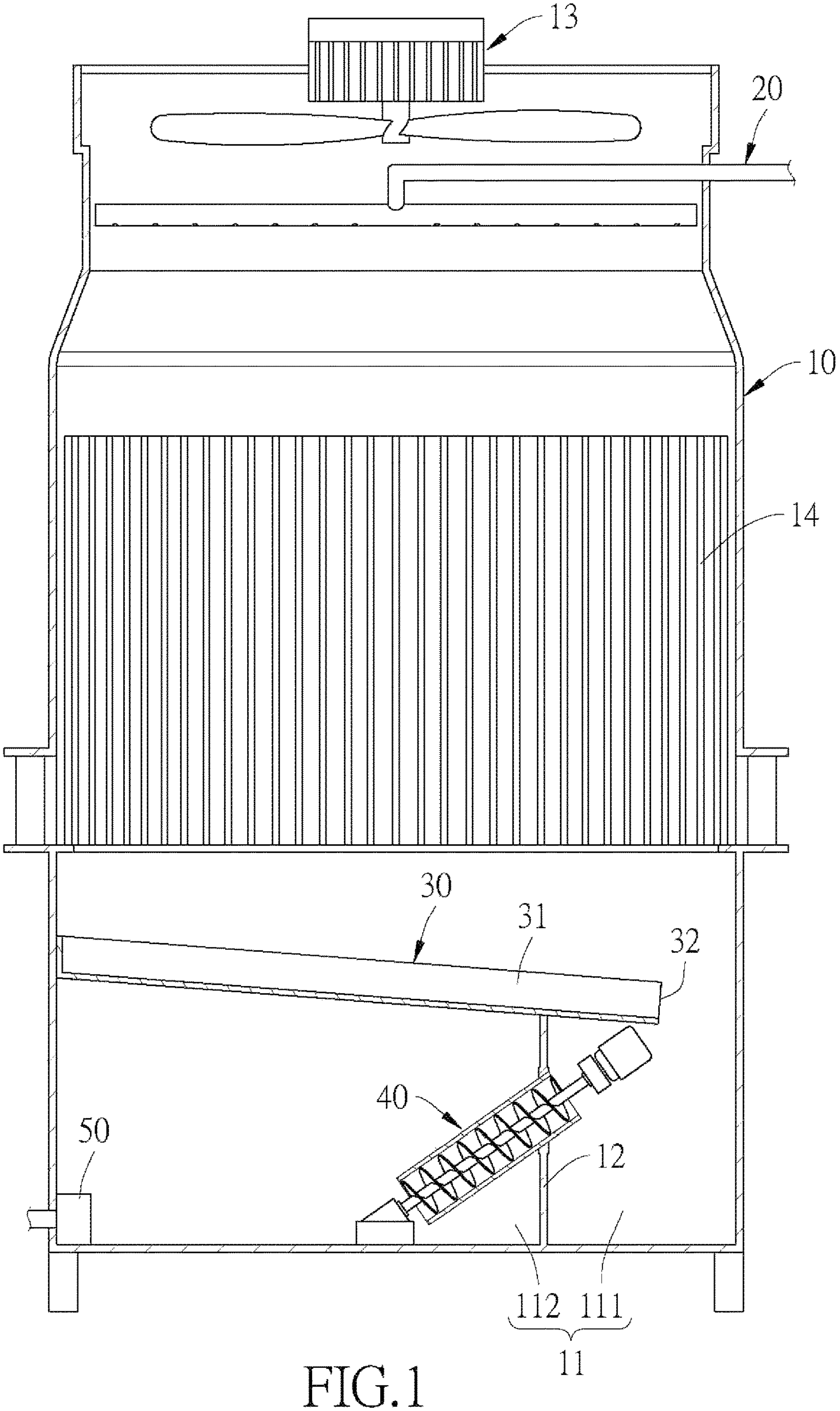
FIG. 1 is a schematic drawing of the first embodiment of the present invention.

While reading the following detailed description, please be aware that similar elements or parts in the description are indicated by the same reference numeral.

Figure 2:
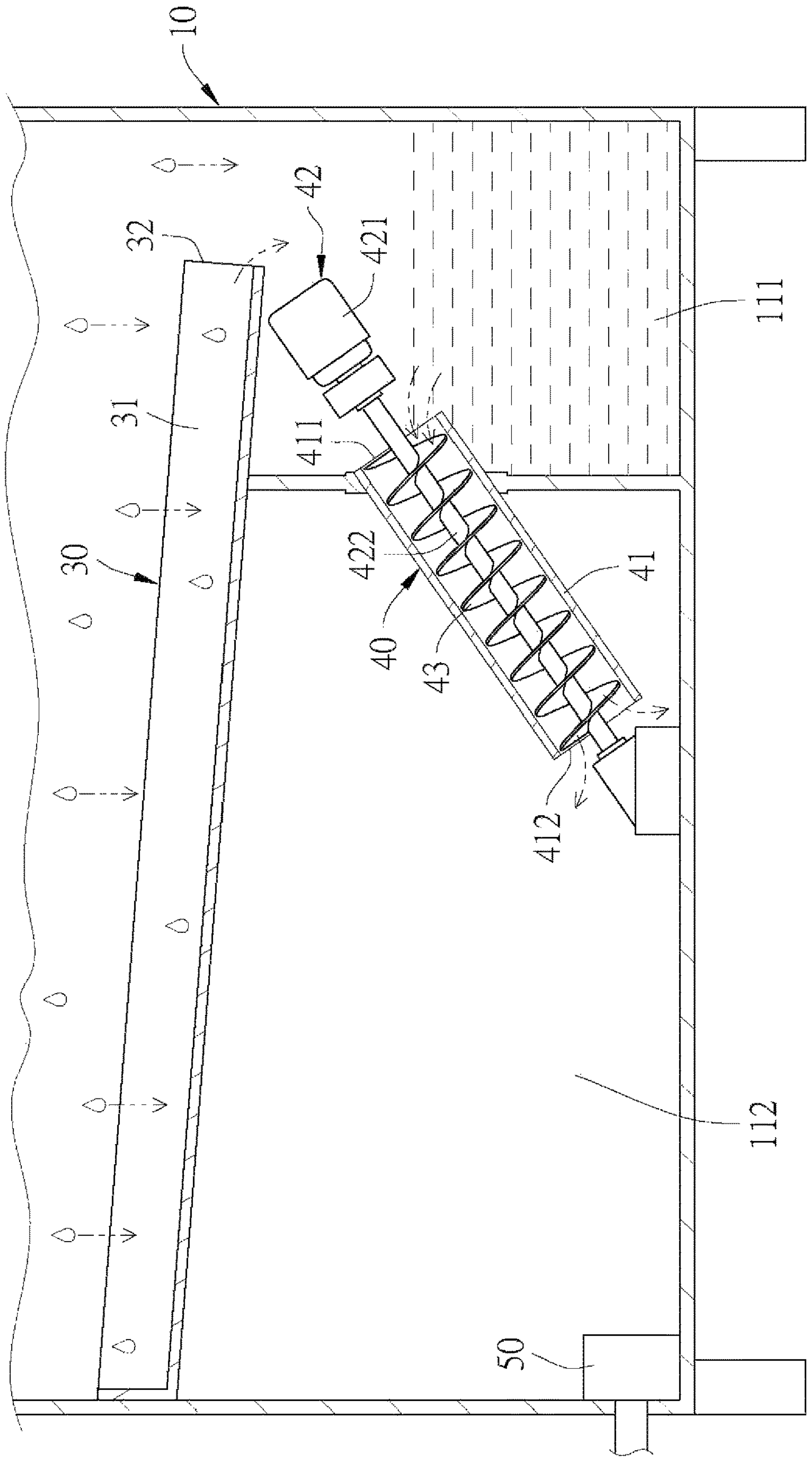
FIG. 2 is a partial enlarged view of the embodiment shown in FIG. 1.

Referring to FIG. 1 and FIG. 2, the first embodiment of the present invention provides a cooling tower that has a hydroelectric power generation unit. The cooling tower is composed essentially of a tower body 10, a water spraying device 20, a water guiding plate 30, a hydroelectric power generation unit 40, and an electric pump 50.

The tower body 10 has a bottom portion provided with a water collection tank 11. The water collection tank 11 is provided with a partition portion 12 and is divided by the partition portion 12 into a water-collecting tank area 111 and a power-generating tank area 112 adjacent to the water-collecting tank area 111. The tower body 10 further has a top portion provided with a fan 13 to enable air convection, and the tower body 10 is provided therein with a plurality of perforated heat dissipation fins 14 that are arranged at intervals in the horizontal direction to facilitate heat dissipation. The fan 13 and the heat dissipation fins 14 are conventional components and therefore will not be described in more detail.

The water spraying device 20 is provided in the tower body 10 and is located above the water-collecting tank area 111. The water spraying device 20 receives high-temperature cooling water from an air-conditioning system and sprays the water out. The water spraying device 20 is a conventional component and therefore will not be described in more detail.

The water guiding plate 30 is provided in the tower body 10 in a tilted manner, is located between the water collection tank 11 and the water spraying device 20, and has a water guiding portion 31 corresponding to the water spraying device 20 and a water outlet 32 connected to the water guiding portion 31 and located above the water-collecting tank area 111. The water guiding portion 31 is configured to receive the water output by the water spraying device 20 and guide the water to the water outlet 32 in order for the water to flow into the water-collecting tank area 111.

The hydroelectric power generation unit 40 is provided in the power-generating tank area 112 of the tower body 10 and is adjacent to the partition portion 12. When the water in the water-collecting tank area 111 flows through the partition portion 12 into the power-generating tank area 112, the same water flows through the hydroelectric power generation unit 40 such that the hydroelectric power generation unit 40 generates electricity from a water level difference of the water. In this embodiment, the hydroelectric power generation unit 40 includes a housing 41, an electric generator 42, and a helical vane 43. The housing 41 has a tubular shape, is provided in the power-generating tank area 112, is supported by the partition portion 12 in a tilted manner, and has a water inlet portion 411 and a water outlet portion 412 lower than the water inlet portion 411 such that a difference in height exists between the water inlet portion 411 and the water outlet portion 412. The water inlet portion 411 in this embodiment is in the water-collecting tank area 111, but the water inlet portion 411 is not necessarily so located. The water inlet portion 411 may be located at the partition portion 12 or in the power-generating tank area 112, provided that the water inlet portion 411 can receive the water flowing from the water-collecting tank area 111 to the power-generating tank area 112 and generate a difference in water level. The electric generator 42 has a power generation module 421 and a power-generating rotating shaft 422. The power-generating rotating shaft 422 is connected to the power generation module 421 and extends in the housing 41. The helical vane 43 is provided in the housing 41, is fixedly provided on the power-generating rotating shaft 422, and is configured to rotate in place. When the water in the water-collecting tank area 111 flows into the power-generating tank area 112 through the partition portion 12, the same water flows into the housing 41 through the water inlet portion 411, exits the housing 41 through the water outlet portion 412, and thereby drives the helical vane 43 to rotate. The rotated helical vane 43 drives the power-generating rotating shaft 422 to rotate simultaneously with the helical vane 43, thereby causing the electric generator 42 to generate electricity.

The electric pump 50 in this embodiment is provided in the power-generating tank area 112 of the tower body 10, but the electric pump 50 is not necessarily so located. The electric pump 50 may be provided outside the tower body 10 and connected to the power-generating tank area 112 of the tower body 10 through a pipe in order to draw the water in the power-generating tank area 112 into the cooling water circulation pipes of the air-conditioning system. The present invention has no limitation on the location of the electric pump 50. In this embodiment, the electric pump 50 is electrically connected to the electric generator 42 so that the electric generator 42 can provide some the electricity required for operation of the electric pump 50.

Having described the major components of the first embodiment of the invention, the present specification continues to disclose how the invention works and the intended effects of the invention.

The water to be cooled is sprayed downward (as indicated by the arrows extending from the water drop symbols in FIG. 2) by the water spraying device 20 and then received by the water guiding portion 31 of the water guiding plate 30 (the water being received by the water guiding portion 31 can be viewed as the water being cooled for the first time). The water guiding portion 31 guides the water received to the water outlet 32 such that the water flows into the water-collecting tank area 111. When the water-collecting tank area 111 is full, the water in the water-collecting tank area 111 flows through the partition portion 12 into the power-generating tank area 112, and the water flowing into the power-generating tank area 112 flows through the hydroelectric power generation unit 40. More specifically, the water flows into the housing 41 through the water inlet portion 411 and exits the housing 41 through the water outlet portion 412, thereby driving the helical vane 43 to rotate. The rotated helical vane 43 drives the power-generating rotating shaft 422 to rotate simultaneously with the helical vane 43, and this results in power generation by the power generation module 421, i.e., the generation of electricity from a water level difference of the water by the hydroelectric power generation unit 40. According to the present invention, the potential energy of cooling water that has been cooled down by the cooling tower can be converted directly into electric energy for storage or for use by a load. The invention, therefore, has an energy-saving effect and contributes to environmental protection.

It is worth mentioning that, with the electric pump 50 in this embodiment being electrically connected to the electric generator 42, and with the present invention being able to directly convert the potential energy of cooling water that has been cooled down by the cooling tower into electric energy, some of the electricity required to operate the electric pump 50 can be provided by the electric generator 42 to truly achieve the intended effects of energy saving and environmental protection.

Figure 3:
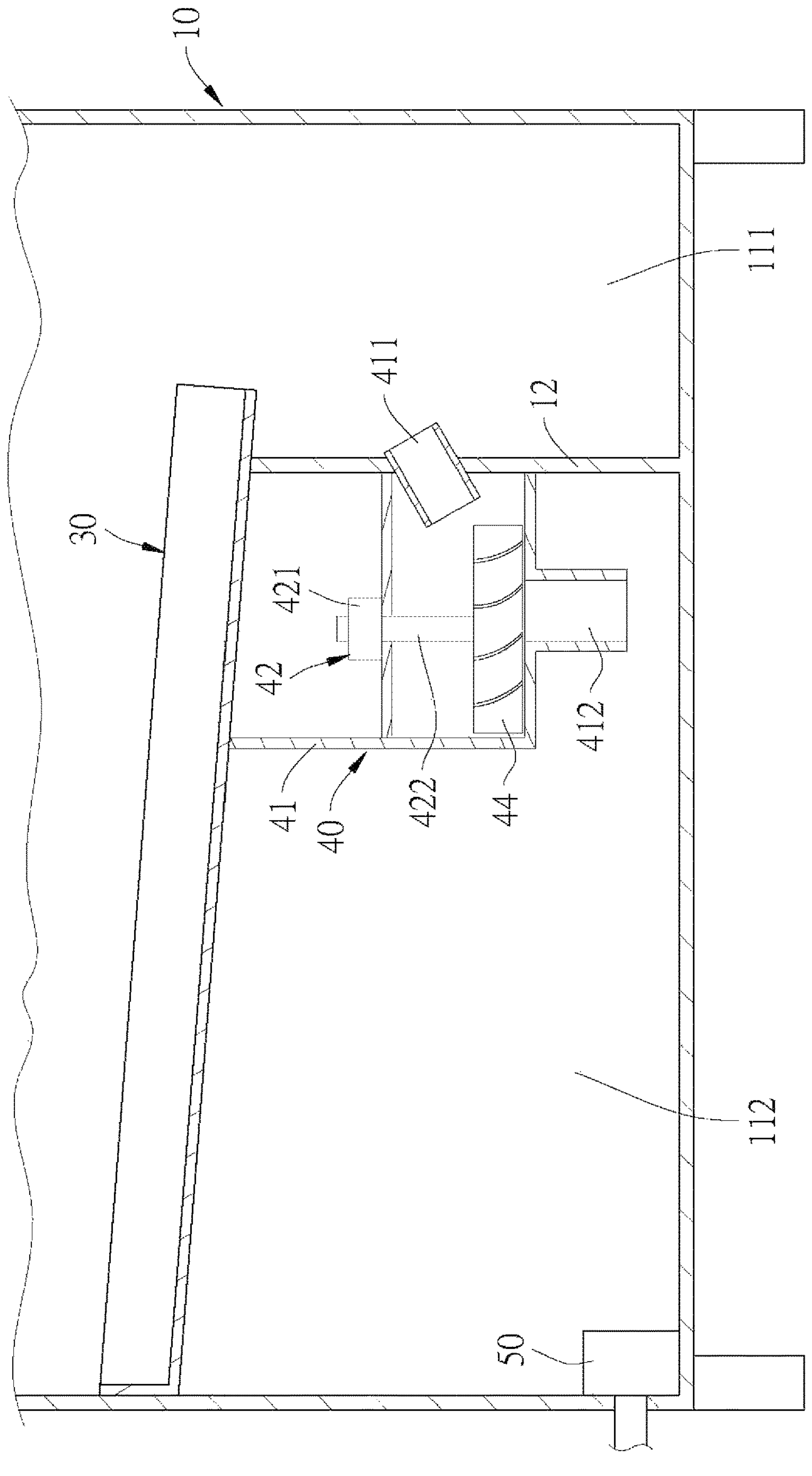
FIG. 3 is a schematic drawing of the second embodiment of the invention.

Referring to FIG. 3, the second embodiment of the present invention provides a cooling tower that has a hydroelectric power generation unit and that is different from the cooling tower in the first embodiment in the configuration of the hydroelectric power generation unit.

In the second embodiment, the hydroelectric power generation unit 40 is composed of a housing 41, an electric generator 42, and runner vanes 44. The housing 41 is provided in the power-generating tank area 112, is adjacent to the partition portion 12, and has a water inlet portion 411 supported by the partition portion 12 and a water outlet portion 412 lower than the water inlet portion 411. The electric generator 42 has a power generation module 421 and a power-generating rotating shaft 422 extending in the housing 41. The runner vanes 44 are provided in the housing 41, are fixedly provided on the power-generating rotating shaft 422, and are configured to rotate in place. When the water in the water-collecting tank area 111 flows through the partition portion 12 into the power-generating tank area 112, the same water flows into the housing 41 through the water inlet portion 411, exits the housing 41 through the water outlet portion 412, and thereby drives the runner vanes 44 into rotation.

More specifically, the water flowing into the housing 41 strikes each runner vane 44 at a center point where the greatest tangential impact can be created. As a result, the runner vanes 44 are rotated and drive the power-generating rotating shaft 422 to rotate, causing the electric generator 42 to generate electricity.

What is claimed is:

1. A cooling tower with a hydroelectric power generation unit, comprising:

a tower body with a water collection tank, wherein the water collection tank is provided with a partition portion and is divided by the partition portion into a water-collecting tank area and a power-generating tank area adjacent to the water-collecting tank area;

a water spraying device provided in the tower body and located above the water-collecting tank area;

a water guiding plate provided in the tower body and located between the water collection tank and the water spraying device, wherein the water guiding plate has a water guiding portion corresponding to the water spraying device and a water outlet connected to the water guiding portion and located above the water-collecting tank area; and the hydroelectric power generation unit, which is provided in the power-generating tank area of the tower body and is adjacent to the partition portion, wherein when water in the water-collecting tank area flows through the partition portion into the power-generating tank area, the water flows through the hydroelectric power generation unit such that the hydroelectric power generation unit generates electricity from a water level difference of the water;

wherein the hydroelectric power generation unit includes a housing, an electric generator, and a helical vane; the housing is provided in the power-generating tank area, is supported by the partition portion, and has a water inlet portion and a water outlet portion lower than the water inlet portion; the electric generator has a power generation module and a power-generating rotating shaft extending in the housing; the helical vane is provided in the housing, is fixedly provided on the power-generating rotating shaft, and is configured to rotate in place; and when the water in the water-collecting tank area flows through the partition portion into the power-generating tank area, the water flows into the housing through the water inlet portion, exits the housing through the water outlet portion, and thereby drives the helical vane into rotation.

2. The cooling tower with the hydroelectric power generation unit as claimed in claim 1, further including an electric pump, wherein the electric pump is provided in the power-generating tank area of the tower body.

3. The cooling tower with the hydroelectric power generation unit as claimed in claim 1, further including an electric pump, wherein the electric pump is provided outside the tower body.

4. The cooling tower with the hydroelectric power generation unit as claimed in claim 2, wherein the electric pump is electrically connected to the electric generator.

5. The cooling tower with the hydroelectric power generation unit as claimed in claim 3, wherein the electric pump is electrically connected to the electric generator.

6. A cooling tower with a hydroelectric power generation unit, comprising:

a tower body with a water collection tank, wherein the water collection tank is provided with a partition portion and is divided by the partition portion into a water-collecting tank area and a power-generating tank area adjacent to the water-collecting tank area;

a water spraying device provided in the tower body and located above the water-collecting tank area;

a water guiding plate provided in the tower body and located between the water collection tank and the water spraying device, wherein the water guiding plate has a water guiding portion corresponding to the water spraying device and a water outlet connected to the water guiding portion and located above the water-collecting tank area; and the hydroelectric power generation unit, which is provided in the power-generating tank area of the tower body and is adjacent to the partition portion, wherein when water in the water-collecting tank area flows through the partition portion into the power-generating tank area, the water flows through the hydroelectric power generation unit such that the hydroelectric power generation unit generates electricity from a water level difference of the water;

wherein the hydroelectric power generation unit includes a housing, an electric generator, and runner vanes; the housing is provided in the power-generating tank area, is adjacent to the partition portion, and has a water inlet portion supported by the partition portion and a water outlet portion lower than the water inlet portion; the electric generator has a power generation module and a power-generating rotating shaft extending in the housing; the runner vanes are provided in the housing, are fixedly provided on the power-generating rotating shaft, and are configured to rotate in place; and when the water in the water-collecting tank area flows through the partition portion into the power-generating tank area, the water flows into the housing through the water inlet portion, exits the housing through the water outlet portion, and thereby drives the runner vanes into rotation.

* * * * *

7. The cooling tower with the hydroelectric power generation unit as claimed in claim 6, further including an electric pump, wherein the electric pump is provided in the power-generating tank area of the tower body.

8. The cooling tower with the hydroelectric power generation unit as claimed in claim 6, further including an electric pump, wherein the electric pump is provided outside the tower body.

9. The cooling tower with the hydroelectric power generation unit as claimed in claim 7, wherein the electric pump is electrically connected to the electric generator.

10. The cooling tower with the hydroelectric power generation unit as claimed in claim 9, wherein the electric pump is electrically connected to the electric generator.

* * * * *